United States Patent Office 3,427,181
Patented Feb. 11, 1969

3,427,181
DEPOSITION OF GOLD ON A TIN NICKEL SURFACE

Christopher Haydn Lowery and Geoffrey Charles Wilson, Bracknell, England, assignors to Ferranti, Limited, Hollinwood, England, a company of Great Britain and Northern Ireland No Drawing. Filed Sept. 14, 1965, Ser. No. 487,331
Claims priority, application Great Britain, Oct. 1, 1964, 40,030/64
U.S. Cl. 117—50 6 Claims
Int. Cl. C23g *1/02*

ABSTRACT OF THE DISCLOSURE

Before the electroless deposition of gold conductors onto a tin nickel underlayer in the manufacture of a miniature printed circuit board, the surface of the tin nickel underlayer is activated by immersion in a mixture consisting essentially of 30% to 60% by weight of orthophosphoric acid and at least one α-hydroxy polycarboxylic acid in aqueous solution, such as citric acid or tartaric acid.

This invention relates to the deposition of gold on a tin nickel surface.

Tin nickel has a good corrosion resistance and for this reason it is sometimes used as a protective plating on the exposed metallic portions of electrical components such as printed circuit boards. However, it is difficult to solder the leads of other components onto the tin nickel surface and it is therefore desirable that a thin layer of gold be deposited on the surface of the tin nickel. The most convenient method of providing the gold layer on the tin nickel surface is by the use of an electroless gold solution but it has been found that simply cleaning the tin nickel surface and then immersing it in an electroless gold solution results in random and patchy deposits of gold.

It is an object of the present invention to provide a method of activating a tin nickel surface such that subsequent immersion of the surface in an electroless gold solution results in the deposition of an even layer of gold on the tin nickel surface.

According to the present invention a method of activating a tin nickel surface such that subsequent immersion of the surface in an electroless gold solution results in the deposition of an even layer of gold on the tin nickel surface comprises the steps of degreasing the tin nickel surface and thereafter immersing the tin nickel surface in a mixture of ortho-phosphoric acid and at least one α-hydroxy polycarboxylic acid in aqueous solution to activate the tin nickel surface.

The proportion of ortho-phosphoric acid (weight per ml. 1.75 grams) preferably lies within the range of 30% to 60% by weight of the solution.

Said α-hydroxy polycarboxylic acid may be citric acid.

One method of activating a tin nickel surface in accordance with the invention will now be described by way of example.

The tin nickel surface to be plated is degreased in the following manner. The surface is lightly abraded with pumice powder, washed under running water, then immersed in a 50% hydrochloric acid v./v. solution for approximately thirty seconds and then again washed under running water. The surface is then immersed in a hot soak cleaner, preferably of the alkaline type, in known manner and then washed under running water to remove all traces of the cleaner. The surface is then activated by immersion in an aqueous acid mixture comprising 50% ortho-phosphoric acid (weight per ml. 1.75 grams) and 25% by weight citric acid ($C_6H_8O_7.H_2O$). The acid mixture is held at a temperature of 100° C. and the tin nickel surface is immersed for a period of three minutes. The surface is removed from the acid mixture and washed under running water.

After activation of the surface in the manner described immersion of the surface in an electroless gold solution results in the deposition of an even layer of gold on the tin nickel surface. Any suitable electroless gold solution may be used, such as the EL–221 Gold solution sold by Shipley Company, Inc., assignee of Patent No. 3,266,929.

The invention described above may be modified in many ways. For example, the proportion of phosphoric acid in the acid mixture may be varied and may lie within the range of 30% to 60% by weight of the solution but preferably lies within the range of 40% to 50%. Also, the citric acid may be replaced by any other α-hydroxy polycarboxylic acid such as tartaric acid or by a mixture of α-hydroxy polycarboxylic acids. Furthermore, the temperature of the acid mixture may be varied, the time for which the tin nickel surface is immersed being varied accordingly.

What we claim is:

1. A method of activating a tin nickel surface such that subsequent immersion of the surface in an electroless gold solution results in the deposition of an even layer of gold on the tin nickel surface comprising the steps of degreasing the tin nickel surface and thereafter immersing the tin nickel surface in a mixture consisting essentially of ortho-phosphoric and at least one α-hydroxy polycarboxylic acid in aqueous solution to activate the tin nickel surface, the proportion of ortho-phosphoric acid (weight per ml. 1.75 grams) lying within the range of 30% to 60% by weight of the solution.

2. A method as claimed in claim 1 in which the proportion of ortho-phosphoric acid (weight per ml. 1.75 grams) lies within the range of 40% to 50% by weight of the solution.

3. A method as claimed in claim 2 in which the proportion of ortho-phosphoric acid (weight per ml. 1.75 grams) is 50% by weight of the solution.

4. A method as claimed in claim 1 in which said α-hydroxy polycarboxylic acid is citric acid.

5. A method as claimed in claim 1 in which said acid mixture is maintained at an elevated temperature.

6. A method as claimed in claim 5 in which said acid mixture is maintained at a temperature of 100° C.

References Cited

UNITED STATES PATENTS

| | | | |
|---|---|---|---|
| 3,214,292 | 10/1965 | Edson | 117—130 X |
| 3,266,929 | 8/1966 | Lareau et al. | 117—130 |

FOREIGN PATENTS

| | | |
|---|---|---|
| 1,329,250 | 4/1963 | France. |

RALPH S. KENDALL, *Primary Examiner.*

U.S. Cl. X.R.

117—213, 227, 130